United States Patent
Shoshan et al.

(10) Patent No.: US 11,853,395 B2
(45) Date of Patent: Dec. 26, 2023

(54) AUGMENTATION LOSS FUNCTION FOR IMAGE CLASSIFICATION

(71) Applicant: International Business Machines Corporation, Armonk, NY (US)

(72) Inventors: Yoel Shoshan, Haifa (IL); Vadim Ratner, Haifa (IL)

(73) Assignee: International Business Machines Corporation, Armonk, NY (US)

(*) Notice: Subject to any disclaimer, the term of this patent is extended or adjusted under 35 U.S.C. 154(b) by 238 days.

(21) Appl. No.: 16/919,130

(22) Filed: Jul. 2, 2020

(65) Prior Publication Data

US 2022/0004823 A1 Jan. 6, 2022

(51) Int. Cl.
*G06F 18/241* (2023.01)
*G06N 3/084* (2023.01)
*G06F 18/211* (2023.01)

(52) U.S. Cl.
CPC .......... *G06F 18/241* (2023.01); *G06F 18/211* (2023.01); *G06N 3/084* (2013.01)

(58) Field of Classification Search
CPC .. G06K 9/6268; G06K 9/6228; G06K 9/6256; G06K 9/6262; G06N 3/084; G06V 10/774; G06V 10/778
See application file for complete search history.

(56) References Cited

U.S. PATENT DOCUMENTS

| | | | | |
|---|---|---|---|---|
| 2016/0005016 A1* | 1/2016 | Eliahu | ................. | G07F 17/0021 705/44 |
| 2019/0318202 A1 | 10/2019 | Zhao et al. | | |
| 2020/0320769 A1* | 10/2020 | Chen | ..................... | G06F 16/538 |

OTHER PUBLICATIONS

Understanding GoogLeNet Model, GeeksforGeeks, May 2020; https://web.archive.org/web/20200505054212/https://www.geeksforgeeks.org/understanding-googlenet-model-cnn-architecture/ (Year: 2020).*
Xie et al., "Unsupervised Data Augmentation for Consistency Training", Sep. 30, 2019, 19 pages.
Anonymous, "Regularization for Deep Learning: A Taxonomy", Feb. 2018, 24 pages.
Xie et al., "Unsupervised Data Augmentation", Apr. 29, 2019, 17 pages.
Xie et al., "DisturbLabel: Regularizing CNN on the Loss Layer", Jun. 2016, 10 pages.
Unknown, "Generalized Linear Model (GLM)", 27 pages.
Zhao et al., "Improved Consistency Regularization for GANs", Feb. 11, 2020, 13 pages.
Mell et al., "The NIST Definition of Cloud Computing", Recommendations of the National Institute of Standards and Technology, Sep. 2011, 7 pages.

* cited by examiner

*Primary Examiner* — Jianxun Yang
(74) *Attorney, Agent, or Firm* — Stosch Sabo (57) ABSTRACT

Described are techniques for training an image classifier using an augmentation loss function. The techniques including inputting corresponding pairs of a plurality of training images to an image classifier, where respective pairs of the corresponding pairs comprise at least two images having a same classification and different augmentations. The techniques further including training an artificial neural network of the image classifier to classify the plurality of training images using an augmentation loss function, wherein the augmentation loss function reduces differences in model outputs between the corresponding pairs of the plurality of training images.

20 Claims, 6 Drawing Sheets

AUGMENTATION LOSS FUNCTION FOR IMAGE CLASSIFICATION

BACKGROUND

The present disclosure relates to image augmentation in image classifiers, and, more specifically, to an augmentation loss function accounting for image augmentation in training artificial neural networks for image classification.

Image classifiers can use one or more artificial neural networks (ANNs) to facilitate automated image classification. An ANN is a network or circuit of artificial neurons or nodes capable of implementing artificial intelligence (AI) solutions (e.g., predictive modeling, computer vision, speech recognition, machine translation, medical diagnosis, image classification, etc.) using algorithms inspired by biological neural networks. In ANNs, edges connecting nodes can be associated with weights that adjust as learning occurs in the ANN. The weights can be indicative of relative importance of various connections between nodes. The weights can be positive (representing excitatory connections) or negative (representing inhibitory connections). Nodes can be organized into layers, where different layers of nodes may perform different transformations on their inputs. Nodes within one layer can receive input from one or more nodes of another layer and likewise provide input to one or more nodes in another layer. ANNs can include an input layer, one or more intervening layers, and an output layer. Signals can be input to the input layer and traverse the one or more intervening layers one or more times before generating an output from the output layer.

SUMMARY

Aspects of the present disclosure are directed toward a computer-implemented method comprising inputting corresponding pairs of a plurality of training images to an image classifier, where respective pairs of the corresponding pairs comprise at least two images having a same classification and different augmentations. The method further comprises training an artificial neural network of the image classifier to classify the plurality of training images using an augmentation loss function, wherein the augmentation loss function reduces differences in model outputs between the corresponding pairs of the plurality of training images.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward image augmentation in image classifiers, and, more specifically, to an augmentation loss function accounting for image augmentation in training artificial neural networks (ANNs) for image classification. While not limited to such applications, embodiments of the present disclosure may be better understood in light of the aforementioned context.

Image classifiers can be trained by supervised learning, unsupervised learning, reinforcement learning, self-learning, or other learning mechanisms. Supervised learning can use a set of inputs, where each input is paired with a desired output. In other words, supervised learning can utilize labeled training data. For example, when training an image classifier using supervised training, a training dataset can be input to the image classifier where each image in the training dataset is associated with the desired classification (e.g., label, description, etc.) of the image. The learning task of the image classifier is to produce the desired classification for each image.

A loss function can be incorporated into the supervised training, where the loss function can be associated with an amount of error between classifications predicted by the image classifier and the desired classifications. Thus, reducing the loss function to an acceptable level can result in an acceptably accurate image classifier. One example loss function is the mean-squared error which can be used to reduce or minimize the average squared error between the image classifier's predicted classifications and the desired classifications.

One challenge in training image classifiers relates to inadequate or imbalanced (e.g., skewed) training datasets. For example, an image classifier trained exclusively on images with a correct orientation will be unlikely to correctly classify an image in an upside-down orientation. In addition to orientations, other variations such as variations in focus, brightness, contrast, color scheme, zoom, and so on can inhibit an image classifier's ability to correctly classify an image that it would otherwise correctly classify when in the correct orientation, focus, brightness, contrast, color scheme, zoom, and so on.

Image augmentation is one technique for remedying inadequate or imbalanced training datasets. Image augmentation refers to modifying images that results in intuitively similar images (between an original image and one or more augmented images) despite potentially large differences between characteristics of the images that are input to the image classifier. Examples of image augmentation can include variations in image orientation, focus, brightness, contrast, color scheme, zoom, and so on. For example, image augmentation related to orientation can take a first training image in proper orientation and generate three copies of the first training image at right orientation, left orientation, and upside-down orientation. In other embodiments, more or fewer orientations can be used (e.g., rotated in 15° increments). Likewise, different or additional augmentations can be made to the image copies such as augmentations related to focus, brightness, contrast, color scheme, zoom, and the like.

Aspects of the present disclosure are directed toward a customized loss function that reduces or minimizes model outputs for different augmentations of a same image when performing supervised training on an image classifier including an ANN. Reducing or minimizing differences in model outputs for different augmentations of a same image can result in an image classifier that is more accurate.

Figure 1:
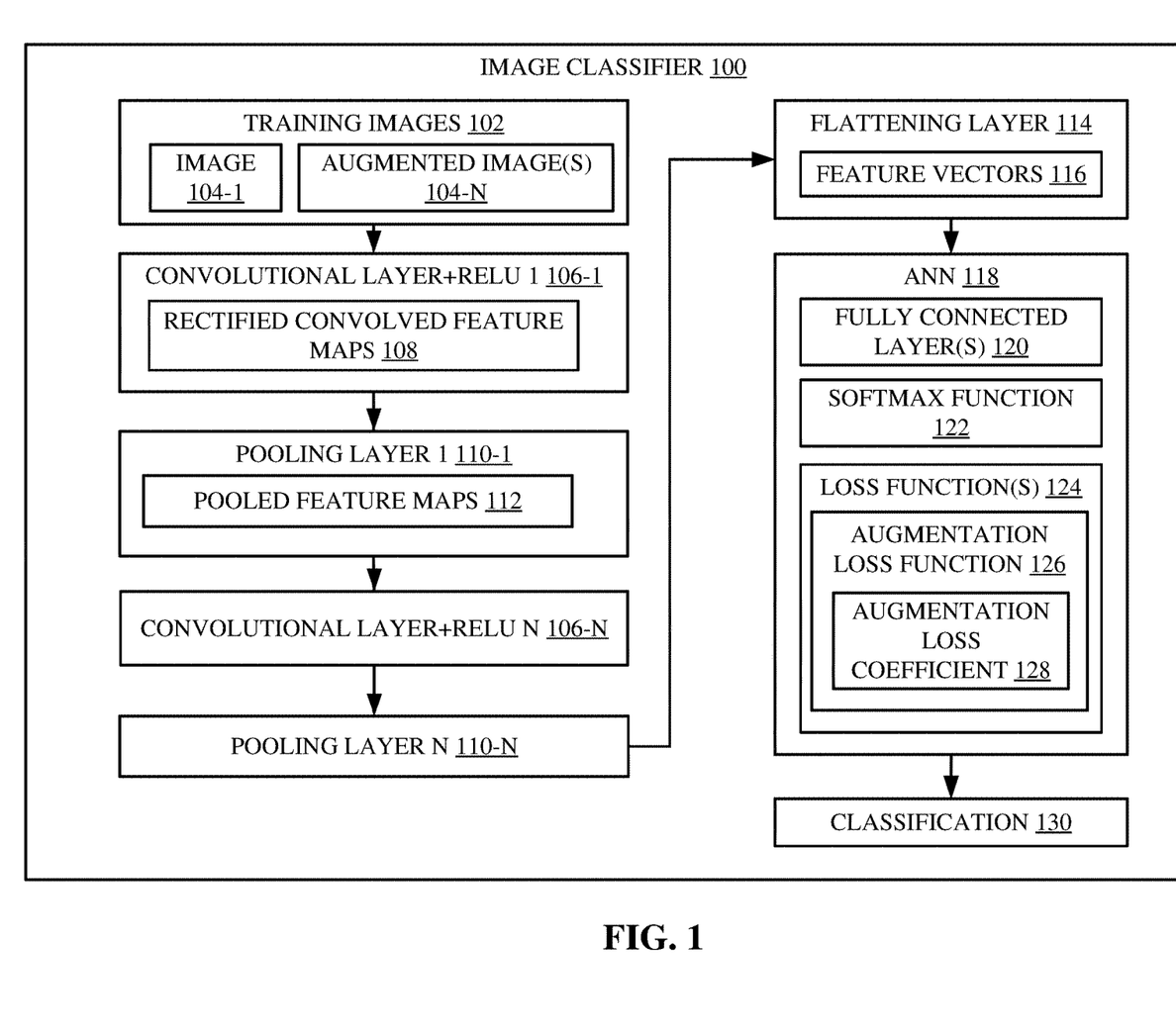
FIG. 1 illustrates a block diagram of an example image classifier, in accordance with some embodiments of the present disclosure.

FIG. 1 illustrates a block diagram of an example image classifier 100, in accordance with some embodiments of the present disclosure. The image classifier 100 can include a plurality of corresponding pairs of training images 102. The plurality of corresponding pairs of training images 102 can include an image 104-1 and one or more corresponding augmented images 104-N. In some embodiments, image 104-1 is an example of an original training image, and augmented images 104-N are one or more corresponding augmented training images. As one example, the image 104-1 can be an image in a correct orientation, and augmented images 104-N can include three copies of the original image 104-1 in a left orientation, a right orientation, and an upside-down orientation. Aspects of the present disclosure are configured to reduce a difference in model outputs using an augmentation loss function for corresponding pairs of the training images 102. In other words, continuing the above example, aspects of the present disclosure are configured to reduce differences in model outputs between the original image 104-1 in the correct orientation and each of the augmented images 104-N in the left orientation, the right orientation, and the upside-down orientation. In some embodiments, aspects of the present disclosure are further configured to reduce differences in model outputs between two augmented images 104-N (e.g., an augmented image in a left orientation and another augmented image in an upside-down orientation). Collectively, reducing model outputs between pairs of original image 104-1 and augmented images 104-N increases classification accuracy at least insofar as (i) the augmented images increase the diversity of the training images 102; and/or (ii) reducing differences in model outputs between an original image 104-1 and an augmented image 104-N causes the image classifier 100 to emphasize salient features of the corresponding pair of images that would lead to similar model outputs and de-emphasize features in the corresponding pair of images that would lead to less similar model outputs.

As will be appreciated by one skilled in the art, orientation is only one of a variety of augmentation techniques that can be used. Other augmentations can relate to changes in focus, brightness, contrast, color scheme, zoom, and so on. Orientation augmentations can be implemented by rotating the original image 104-1. Focus, brightness, contrast, and color scheme augmentations can be implemented by altering pixel characteristics in the original image 104-1. Zoom augmentations can be implemented by selecting one or more subframes of the original image 104-1 as the augmented images 104-N. Furthermore, in some embodiments, augmentations can be combined. For example, an original image 104-1 can be both rotated and have brightness values of its pixels altered to generate an augmented image 104-N.

The training images 102 are provided to a first convolutional layer and rectified linear unit (ReLU) 106-1. The convolutional layer can be configured to use any number of filters, filter sizes, and/or other convolutional neural network (CNN) parameters useful for extracting data from an image. The convolutional layer can function to identify features in each of the training images 102. The ReLU can be configured to apply an activation function to the feature map generated by the convolutional layer in order to increase non-linearity. In some embodiments, the ReLU converts negative numbers in the feature map to zero. The output of the first convolutional layer and ReLU 106-1 is at least one rectified convolved feature map 108 for each of the training images 102.

The rectified convolved feature maps 108 can be input to a first pooling layer 110-1. The first pooling layer 110-1 can be configured to reduce the size of the rectified convolved feature maps 108. Advantageously, reducing the size of the rectified convolved feature maps 108 can be beneficial for reducing overfitting. The first pooling layer 110-1 can use max pooling, average pooling, sum pooling or another technique to convert the rectified convolved feature maps 108 to pooled feature maps 112.

The image classifier 100 can include any number of convolutional layers and ReLUs 106 and any number of pooling layers 110 as shown by an Nth convolutional layer and ReLU 106-N and an Nth pooling layer 110-N. Whatever the number of convolutional layers and ReLUs 106 and pooling layers 110, the final pooled feature maps 112 are ultimately provided to a flattening layer 114. The flattening layer 114 is configured to convert the pooled feature maps 112 to feature vectors 116. In some embodiments, the flattening layer 114 compresses each of the pooled feature maps 112 into a feature vector 116 by converting each of the pooled feature maps 112 into a single column of numbers.

The feature vectors 116 can be input to an ANN 118. The ANN 118 can include one or more fully connected layers 120, where each neuron in each of the fully connected layers 120 is connected to every other neuron in an adjacent layer. The fully connected layers 120 can be useful for converting the feature vectors 116 into attributes useful for predicting a classification of an image.

The ANN 118 can further include a softmax function 122 that can convert the output of the fully connected layers 120 to a softmax vector storing numbers between zero and one, and where a sum of all the components of the softmax vector add up to one. Accordingly, the numbers in the softmax vector can be considered as probabilities of various classifications for a given image.

Errors (e.g., inaccurate classifications of the training images 102) can be backpropagated using a loss function 124. The loss function 124 can alter weights in the fully connected layers 120 and/or features included in the feature vectors 116 to improve the accuracy of classifications generated by the image classifier 100.

In accordance with embodiments of the present disclosure, the loss function 124 can include an augmentation loss function 126. The augmentation loss function 126 can calculate differences between model outputs for corresponding pairs of training images 102 (e.g., a difference in model outputs for image 104-1 compared to augmented image 104-N). The augmentation loss function 126 can be backpropagated to reduce these differences in model outputs for augmented variations of a same image. In other words, the augmentation loss function 126 can increase the accuracy of the image classifier 100 by training the image classifier 100 to treat the augmented images 104-N similarly to the original image 104-1. The augmentation loss function 126 can use one or more of the feature vectors 116, softmax vectors, and/or classifications 130 as the model outputs.

In some embodiments, the augmentation loss function 126 includes an augmentation loss coefficient 128 that can be used to reflect a difficulty, complexity, or hardness of the type of augmentation(s) used in a given corresponding pair of training images 102. For example, the augmentation loss coefficient 128 could be relatively high for an augmented image 104-N that is rotated relative to an original image 104-1 insofar as these images remain quite similar and thus the differences in model outputs generated by them should be straightforward to reduce. In contrast, the augmentation loss coefficient 128 may be relatively smaller for an augmented image 104-N that is rotated, zoomed, and unfocused relative to an original image 104-1 insofar as these images are quite different and it may be advantageous to cause the image classifier 100 to reduce model outputs between these two images to a relatively more modest or lesser degree.

Once the image classifier 100 is trained, the image classifier 100 can output one or more classifications 130 for each new image it receives based on the probabilities reflected in the softmax function 122. In some embodiments, the classification 130 includes a classifier for every output of the softmax vector that is above a threshold, whereas in other embodiments, the classification 130 includes a highest output of the softmax vector.

Figure 2:
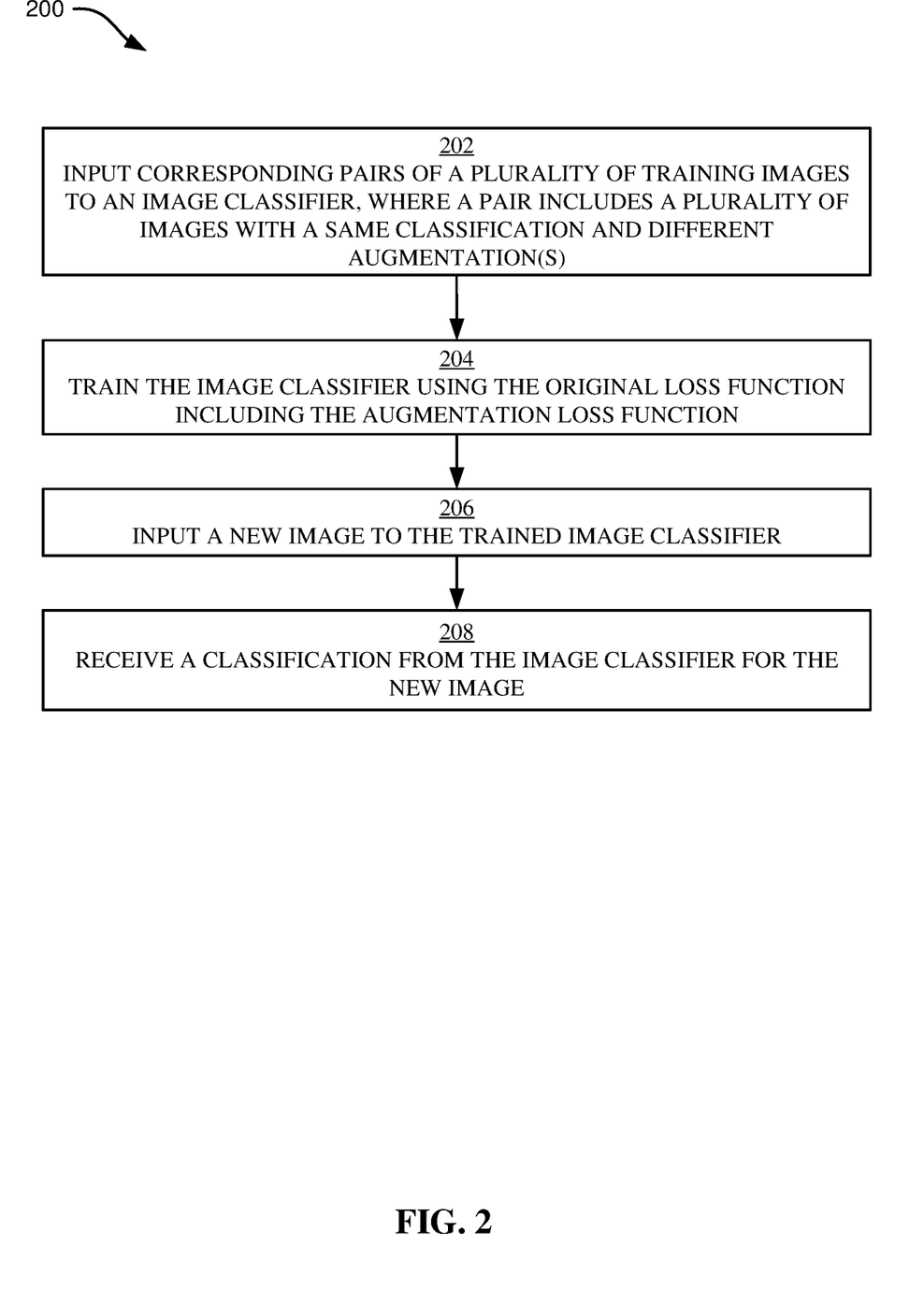
FIG. 2 illustrates a flowchart of an example method for utilizing an image classifier that is trained using an augmentation loss function, in accordance with some embodiments of the present disclosure.

FIG. 2 illustrates a flowchart of an example method 200 for utilizing an image classifier 100 that is trained using an augmentation loss function, in accordance with some embodiments of the present disclosure. In some embodiments, the method 200 can be implemented by an image classifier 100, one or more computers, processors, servers, cloud computing nodes, and/or another configuration of hardware and/or software.

Operation 202 includes inputting a plurality of corresponding pairs of training images 102 to an image classifier 100. In some embodiments, respective pairs include a plurality of images with a same classification and different augmentations. For example, a pair can include an original training image 104-1 and one or more augmented training images 104-N or two augmented training images 104-N with different augmentations. Said another way, in some embodiments, respective pairs of the plurality of corresponding pairs can include one or more of (i) an original training image and an augmented training image that is the original training image modified by least one augmentation and/or (ii) a first augmented training image that is an original training image modified by at least one augmentation, and a second augmented training image that is the original training image modified by at least one different augmentation.

Operation 204 includes training the image classifier 100 using an original loss function 124 that includes an augmentation loss function 126. The augmentation loss function 126 can reduce differences in model outputs between the corresponding pairs of the plurality of training images 102. In various embodiments, the model outputs can be one or more of the feature vectors 116, softmax vectors, and/or classifications 130. Regardless of which model outputs are used, the augmentation loss function 126 can function to make the model outputs for an original image 104-1 similar to (e.g., less different from) model outputs for a corresponding augmented image 104-N. In some embodiments, operation 204 includes utilizing an augmentation loss coefficient 128 to reflect a complexity, difficulty, or hardness for accurately classifying different types of augmentations (or combinations thereof). Operation 204 is discussed in more detail hereinafter with respect to FIG. 3.

Operation 206 includes inputting a new image to the trained image classifier 100. Operation 208 includes receiving one or more classifications 130 from the image classifier 100 and corresponding to the new image. Advantageously, the one or more classifications 130 received in operation 208 can exhibit improved accuracy relative to traditional image classifiers insofar as the image classifier 100 is trained using an augmentation loss function 126.

Figure 3:
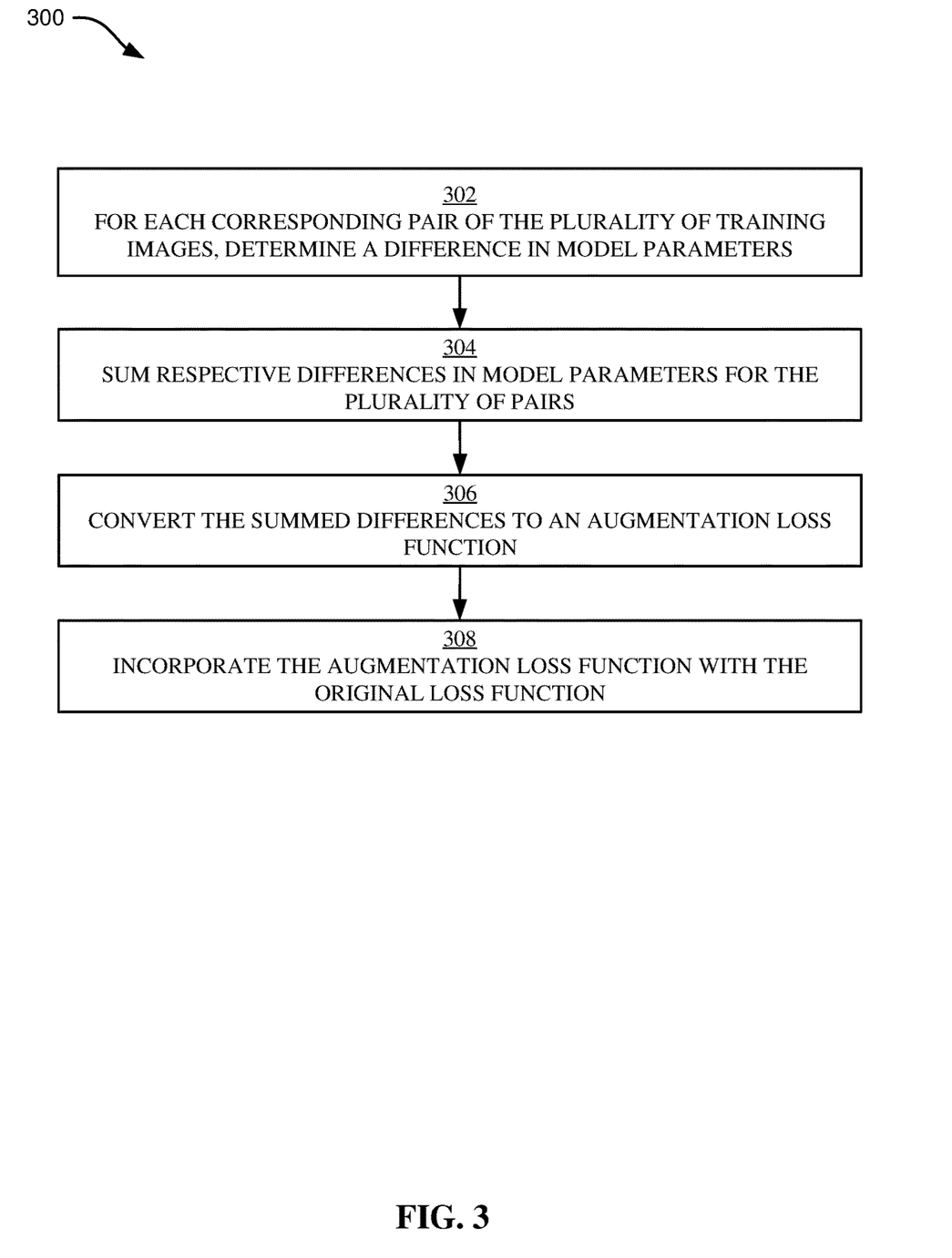
FIG. 3 illustrates a flowchart of an example method for generating an augmentation loss function, in accordance with some embodiments of the present disclosure.

FIG. 3 illustrates a flowchart of an example method 300 for defining an augmentation loss function 126, in accordance with some embodiments of the present disclosure. In some embodiments, the method 300 can be implemented by an image classifier 100, one or more computers, processors, servers, cloud computing nodes, and/or another configuration of hardware and/or software. In some embodiments, the method 300 is a sub-method of operation 204 of FIG. 2.

Operation 302 includes, for each corresponding pair of the plurality of training images 102 (e.g., one original image 104-1 and one augmented image 104-N, or two augmented images 104-N), determining a difference in model parameters. In various embodiments, the model parameters are feature vectors 116, softmax vectors, or classifications 130. In embodiments where the model parameters are in vector format, the difference can be determined using an absolute value of the difference between a vector associated with the original image 104-1 subtracted from a vector associated with the augmented image 104-N (or vice versa), a squared term of the aforementioned difference instead of the absolute value, a cosine distance, an L1 distance (e.g., the sum of the absolute value of each term of the vector), an L2 distance (e.g., the square root of the sum of the squared vector values), or another distance. In embodiments where the model parameters are classifications 130, the difference can be a binary output (e.g., a match or not a match) between the classifications 130 of the corresponding training images.

Operation 304 includes summing respective differences from operation 302 for the plurality of corresponding pairs. Operation 306 includes converting the summed differences to an augmentation loss function 126. Operation 308 includes incorporating the augmentation loss function 126 with the original loss function 124. In some embodiments, operation 308 incorporates the augmentation loss function 126 into the original loss function 124 using a coefficient to moderate the importance placed on the augmentation loss function 126 as a component of the original loss function 124.

Said another way, the method 300 can be implemented according to Equation 1.

$$\alpha \Sigma_{n=1}^{N} \Sigma_{i<j} \tau(m(S_{n,i}),(S_{n,j})) \quad \text{Equation 1:}$$

As shown in Equation 1, $\alpha$ can be a coefficient which moderates the weighting of the augmentation loss function 126 relative to the original loss function 124. Likewise, n can refer to the respective training images and i through j can represent different augmentations (e.g., rotations, brightness, contrast, color scheme, focus, zoom, etc.) for each training image n. The term T can represent a distance function suitable for measuring the difference in model outputs between images in a corresponding pair of training images (e.g., an absolute value of the difference in model outputs, a square of the difference in model outputs, a cosine distances, L1 distance, L2 distance, or another distance).

Furthermore, the term m can represent a modelling function configured to generate the model output (e.g., a feature vector 116, an output vector of softmax function 122, or a classification 130).

Although not shown in Equation 1, respective augmentations can be associated with an augmentation loss coefficient 128 that is indicative of the difficulty, complexity, or hardness of generating similar model outputs for an augmented image 104-N having the aforementioned augmentation relative to an original image 104-1 (or another augmented image 104-N with different augmentation(s)). In such embodiments, a discrete augmentation loss coefficient 128 can be associated with each augmentation i through j.

Figure 4:
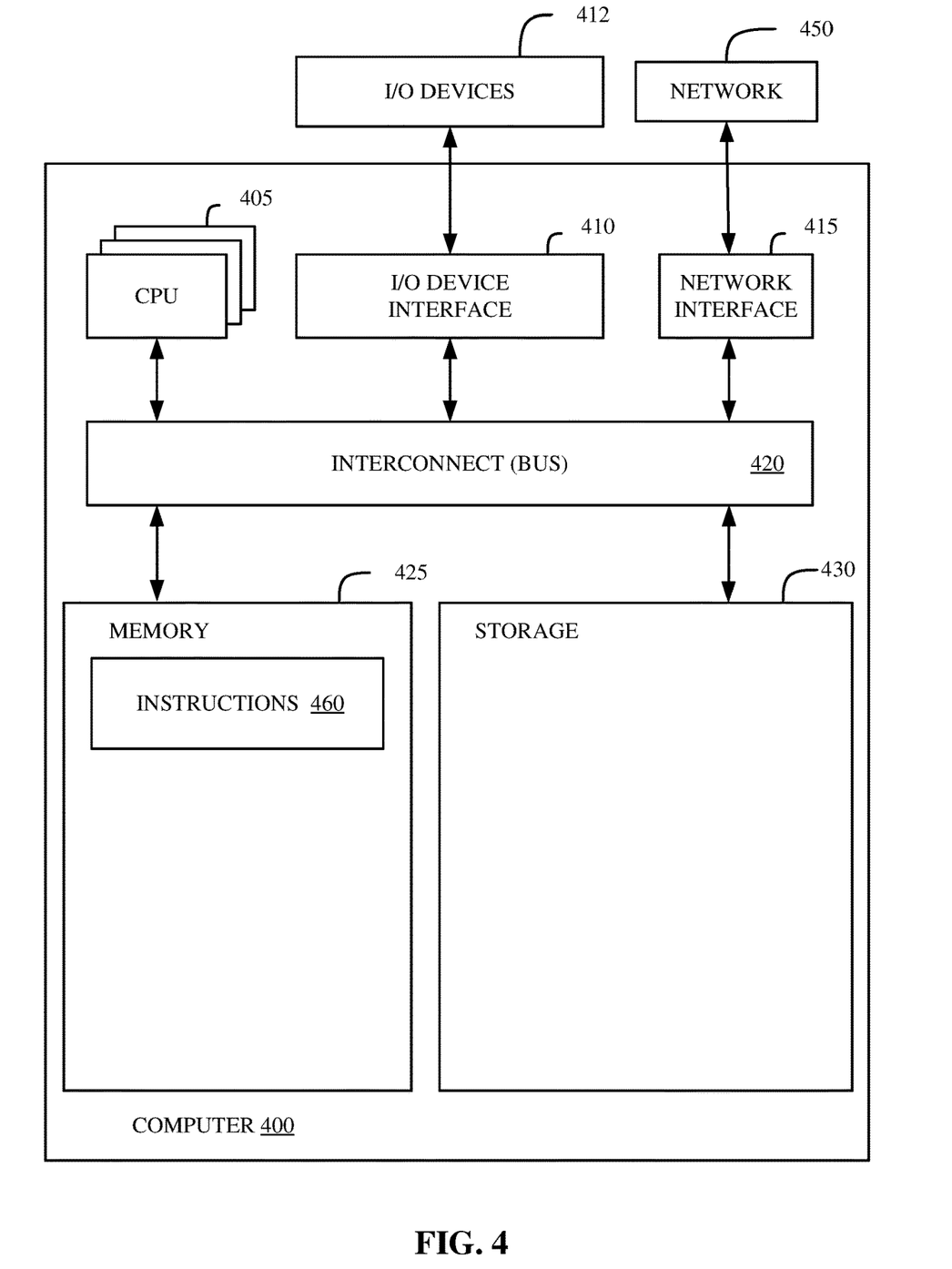
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform any or all of the methods described in FIGS. 2-3 and/or implement the functionality discussed in FIG. 1. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into (or functionality similar to computer 400 is virtually provisioned to) the image classifier 100 or other aspects of the present disclosure.

Computer 400 includes memory 425, storage 430, interconnect 420 (e.g., BUS), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more busses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be computer-readable and computer-executable instructions for performing any portion of, or all of, the methods of FIGS. 2-3 and/or implementing the functionality discussed in FIG. 1. Although instructions 460 are shown in memory 425, instructions 460 can include program instructions collectively stored across numerous computer-readable storage media and executable by one or more CPUs 405.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
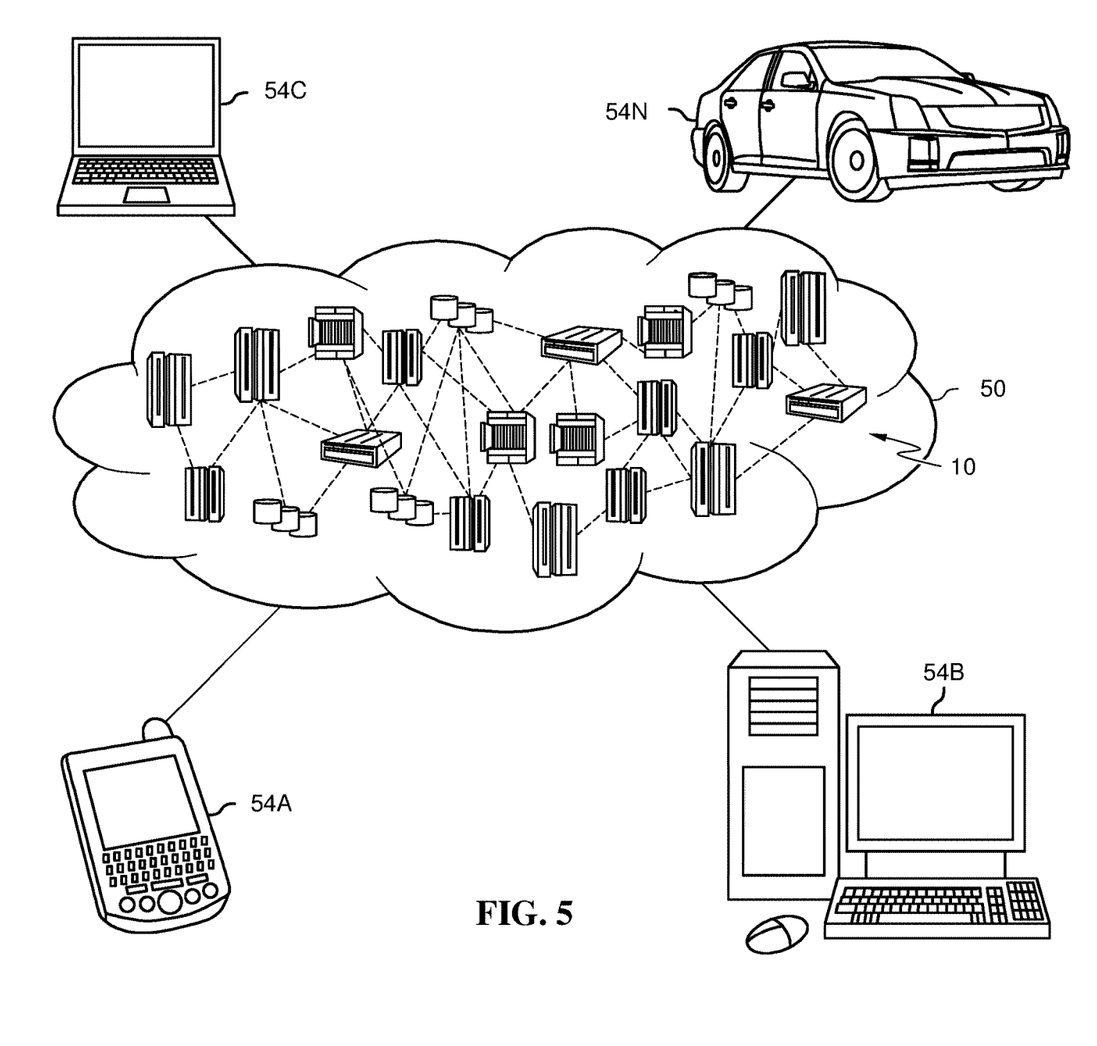
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
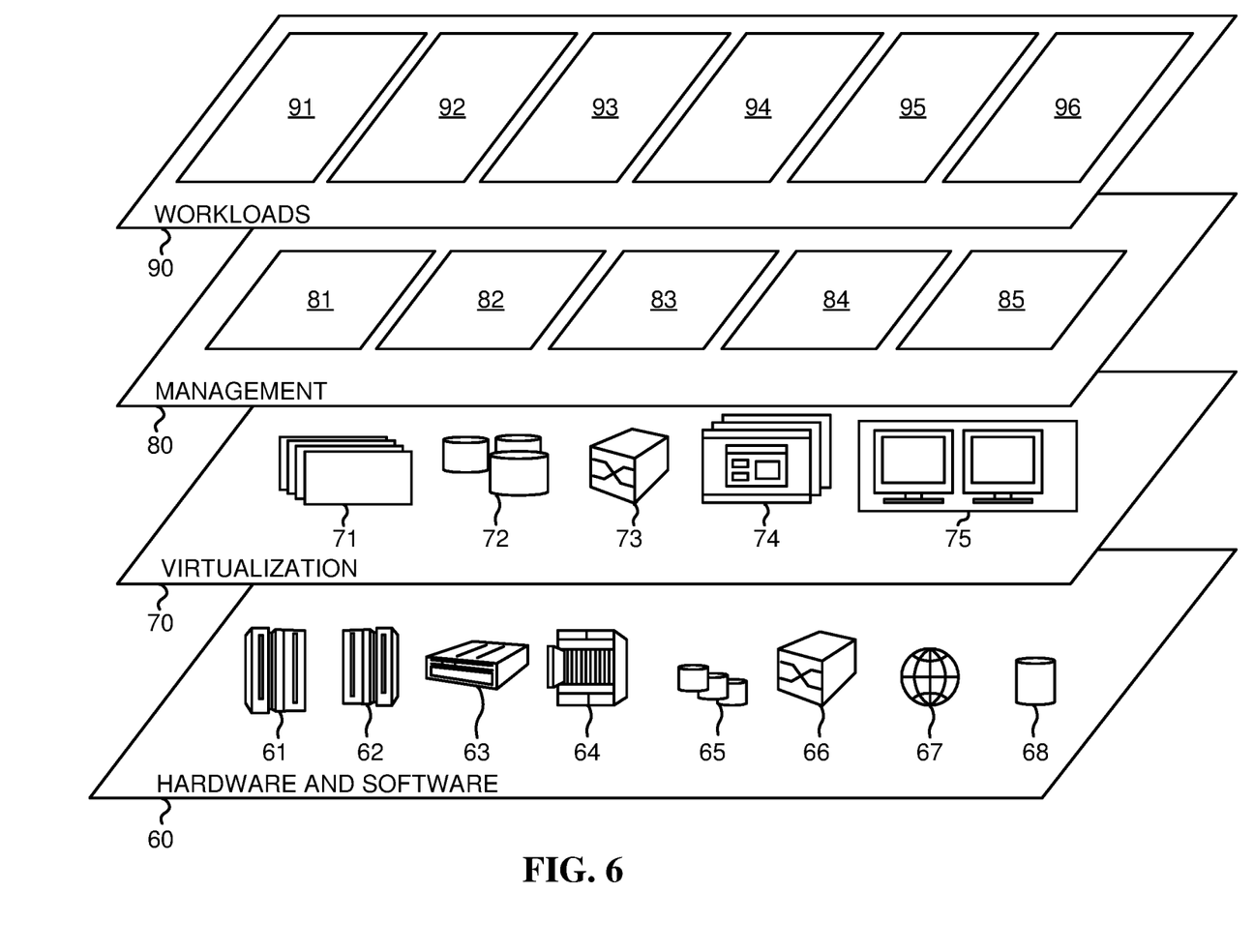
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and supervised image classification training using an augmentation loss function 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any portion of the method described with respect to FIGS. 2-3 and/or implement any portion of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes inputting corresponding pairs of a plurality of training images to an image classifier, wherein respective pairs of the corresponding pairs comprise at least two images having a same classification and different augmentations; and training an artificial neural network of the image classifier to classify the plurality of training images using an augmentation loss function, wherein the augmentation loss function reduces differences in model outputs between the corresponding pairs of the plurality of training images.

Example 2 includes the method of example 1, including or excluding optional features. In this example, respective pairs of the corresponding pairs comprise an original training image and an augmented training image that is the original training image modified by least one augmentation.

Example 3 includes the method of any one of examples 1 to 2, including or excluding optional features. In this example, respective pairs of the corresponding pairs comprise a first augmented training image that is an original training image modified by at least one augmentation, and a second augmented training image that is the original training image modified by at least one different augmentation.

Example 4 includes the method of any one of examples 1 to 3, including or excluding optional features. In this example, the model outputs comprise feature vectors for the plurality of training images.

Example 5 includes the method of any one of examples 1 to 4, including or excluding optional features. In this example, the model outputs comprise softmax vectors for the plurality of training images.

Example 6 includes the method of any one of examples 1 to 5, including or excluding optional features. In this example, the model outputs comprise classifications for the plurality of training images.

Example 7 includes the method of any one of examples 1 to 6, including or excluding optional features. In this example, a difference in the model outputs for a first pair of the corresponding pairs is associated with a coefficient based on a level of complexity associated with the different augmentations.

Example 8 includes the method of any one of examples 1 to 7, including or excluding optional features. In this example, the different augmentations are one or more augmentations selected from a group of augmentations consisting of: an orientation modification, a focus modification, a brightness modification, a contrast modification, a color scheme modification, and a zoom modification.

Example 9 includes the method of any one of examples 1 to 8, including or excluding optional features. In this example, the image classifier includes at least one convolutional layer, at least one rectified linear unit (RELU), at least one pooling layer, and at least one flattening layer, and wherein the artificial neural network comprises at least one fully connected layer and at least one softmax function.

Example 10 includes the method of any one of examples 1 to 9, including or excluding optional features. In this example, the method is performed by the image classifier according to software that is downloaded to the image classifier from a remote data processing system. Optionally, the method further comprises: metering a usage of the software; and generating an invoice based on metering the usage.

Example 11 is a system. The system includes one or more processors; and one or more computer-readable storage media storing program instructions which, when executed by the one or more processors, are configured to cause the one or more processors to perform a method according to any one of examples 1 to 10.

Example 12 is a computer program product. The computer program product includes one or more computer readable storage media, and program instructions collectively stored on the one or more computer readable storage media, the program instructions comprising instructions configured to cause one or more processors to perform a method according to any one of examples 1 to 10.

What is claimed is:

1. A computer-implemented method comprising:
   inputting corresponding pairs of a plurality of training images to an image classifier, wherein respective pairs of the corresponding pairs comprise at least two images having a same classification and different augmentations; and
   training an artificial neural network of the image classifier to classify the plurality of training images using an augmentation loss function, wherein the augmentation loss function reduces differences in model outputs between the corresponding pairs of the plurality of training images, and wherein a difference in the model outputs for a first pair of the corresponding pairs is associated with a coefficient, wherein the coefficient is relatively larger when the different augmentations comprise a single augmentation, and wherein the coefficient is relatively smaller when the different augmentations comprise a combination of multiple augmentations.

2. The method of claim 1, wherein respective pairs of the corresponding pairs comprise an original training image and an augmented training image that is the original training image modified by least one augmentation.

3. The method of claim 1, wherein respective pairs of the corresponding pairs comprise a first augmented training image that is an original training image modified by at least one augmentation, and a second augmented training image that is the original training image modified by at least one different augmentation.

4. The method of claim 1, wherein the model outputs comprise feature vectors for the plurality of training images.

5. The method of claim 1, wherein the model outputs comprise softmax vectors for the plurality of training images.

6. The method of claim 1, wherein the model outputs comprise classifications for the plurality of training images.

7. The method of claim 1, wherein the different augmentations comprise an orientation modification, a focus modification, a brightness modification, a contrast modification, a color scheme modification, and a zoom modification.

8. The method of claim 1, wherein the image classifier includes at least one convolutional layer, at least one rectified linear unit (RELU), at least one pooling layer, and at least one flattening layer, and wherein the artificial neural network comprises at least one fully connected layer and at least one softmax function.

9. The method of claim 1, wherein the method is performed by the image classifier according to software that is downloaded to the image classifier from a remote data processing system.

10. The method of claim 9, wherein the method further comprises:
    metering a usage of the software; and
    generating an invoice based on metering the usage.

11. A system comprising:
    one or more processors; and
    one or more computer-readable storage media storing program instructions which, when executed by the one or more processors, are configured to cause the one or more processors to perform a method comprising:
    inputting corresponding pairs of a plurality of training images to an image classifier, wherein respective pairs of the corresponding pairs comprise at least two images having a same classification and different augmentations; and
    training an artificial neural network of the image classifier to classify the plurality of training images using an augmentation loss function, wherein the augmentation loss function reduces differences in model outputs between the corresponding pairs of the plurality of training images, and wherein a difference in the model outputs for a first pair of the corresponding pairs is associated with a coefficient, wherein the coefficient is relatively larger when the different augmentations comprise a single augmentation, and wherein the coefficient is relatively smaller when the different augmentations comprise a combination of multiple augmentations.

12. The system of claim 11, wherein respective pairs of the corresponding pairs comprise
    an original training image and an augmented training image that is the original training image modified by least one augmentation.

13. The system of claim 11, wherein the model outputs are selected from a group consisting of:
    feature vectors for the plurality of training images;
    softmax vectors for the plurality of training images; and
    classifications for the plurality of training images.

14. The system of claim 11, wherein the different augmentations comprise an orientation modification, a focus modification, a brightness modification, a contrast modification, a color scheme modification, and a zoom modification.

15. The system of claim 11, wherein respective pairs of the corresponding pairs comprise a first augmented training image that is an original training image modified by at least one augmentation, and a second augmented training image that is the original training image modified by at least one different augmentation.

16. A computer program product comprising one or more computer readable storage media, and program instructions collectively stored on the one or more computer readable storage media, the program instructions comprising instructions configured to cause one or more processors to perform a method comprising:
    inputting corresponding pairs of a plurality of training images to an image classifier, wherein respective pairs of the corresponding pairs comprise at least two images having a same classification and different augmentations; and training an artificial neural network of the image classifier to classify the plurality of training images using an augmentation loss function, wherein the augmentation loss function reduces differences in model outputs between the corresponding pairs of the plurality of training images, and wherein a difference in the model outputs for a first pair of the corresponding pairs is associated with a coefficient, wherein the coefficient is relatively larger when the different augmentations comprise a single augmentation, and wherein the coefficient is relatively smaller when the different augmentations comprise a combination of multiple augmentations.

17. The computer program product of claim 16, wherein respective pairs of the corresponding pairs comprise an original training image and an augmented training image that is the original training image modified by least one augmentation.

18. The computer program product of claim 16, wherein the model outputs are selected from a group consisting of:

feature vectors for the plurality of training images;

softmax vectors for the plurality of training images; and classifications for the plurality of training images.

19. The computer program product of claim 16, wherein respective pairs of the corresponding pairs comprise a first augmented training image that is an original training image modified by at least one augmentation, and a second augmented training image that is the original training image modified by at least one different augmentation.

20. The computer program product of claim 16, wherein the different augmentations comprise an orientation modification, a focus modification, a brightness modification, a contrast modification, a color scheme modification, and a zoom modification.

* * * * *